(12) United States Patent
Bohl et al.

(10) Patent No.: US 11,618,412 B2
(45) Date of Patent: Apr. 4, 2023

(54) SYSTEMS AND METHODS FOR VEHICLE USE AUTHENTICATION

(71) Applicant: Harman International Industries, Incorporated, Stamford, CT (US)

(72) Inventors: Greg Bohl, Muenster, TX (US); Prithvi Kambhampati, Dallas, TX (US); Nikhil Patel, Prosper, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 333 days.

(21) Appl. No.: 16/989,628

(22) Filed: Aug. 10, 2020

(65) Prior Publication Data

US 2021/0053530 A1   Feb. 25, 2021

Related U.S. Application Data

(60) Provisional application No. 62/891,032, filed on Aug. 23, 2019.

(51) Int. Cl.
| | |
|---|---|
| *B60R 25/20* | (2013.01) |
| *B60R 25/25* | (2013.01) |
| *G06F 16/583* | (2019.01) |
| *B60R 25/30* | (2013.01) |
| *B60R 25/102* | (2013.01) |
| *B60R 25/01* | (2013.01) |
| *G06V 20/56* | (2022.01) |
| *G06V 20/59* | (2022.01) |
| *G06V 40/50* | (2022.01) |
| *G06V 40/16* | (2022.01) |
| *G06F 18/22* | (2023.01) |

(52) U.S. Cl.
CPC .............. *B60R 25/20* (2013.01); *B60R 25/01* (2013.01); *B60R 25/102* (2013.01); *B60R 25/25* (2013.01); *B60R 25/305* (2013.01); *G06F 16/5854* (2019.01); *G06F 18/22* (2023.01); *G06V 20/56* (2022.01); *G06V 20/597* (2022.01); *G06V 40/171* (2022.01); *G06V 40/172* (2022.01); *G06V 40/50* (2022.01)

(58) Field of Classification Search
CPC ....... B60R 25/20; B60R 25/01; B60R 25/102; B60R 25/25; B60R 25/305; G06F 16/5854; G06K 9/6201
See application file for complete search history.

(56) References Cited

U.S. PATENT DOCUMENTS

| | | | | |
|---|---|---|---|---|
| 6,038,666 A * | 3/2000 | Hsu | ..................... | G07C 9/00563 726/28 |
| 6,108,591 A * | 8/2000 | Segal | ..................... | G08G 1/127 701/1 |
| 7,908,645 B2 * | 3/2011 | Varghese | .............. | G06F 21/552 715/833 |

(Continued)

*Primary Examiner* — Gertrude Arthur Jeanglaude
(74) *Attorney, Agent, or Firm* — McCoy Russell LLP

(57) ABSTRACT

Systems and methods that compare a validation image to one or more confirmation data sets, wherein each of the one or more confirmation sets is formed based on matching a document image and a confirmation image. In at least one example, one or more vehicle operability actions may be performed responsive to the validation image matching a confirmation data set of the one or more confirmation data sets. A refusal action may further be performed responsive to the validation image not matching the confirmation data, for example.

20 Claims, 7 Drawing Sheets

(56) References Cited

U.S. PATENT DOCUMENTS

| | | | | |
|---|---|---|---|---|
| 2001/0026632 A1* | 10/2001 | Tamai | ............... | G06V 40/13 |
| | | | | 382/116 |
| 2006/0278705 A1* | 12/2006 | Hedley | ............... | G07B 15/063 |
| | | | | 235/382 |
| 2016/0027079 A1* | 1/2016 | Schoeffler | ............... | H04L 63/12 |
| | | | | 705/325 |
| 2019/0172111 A1* | 6/2019 | Schoeffler | ............... | G06Q 30/0609 |

* cited by examiner

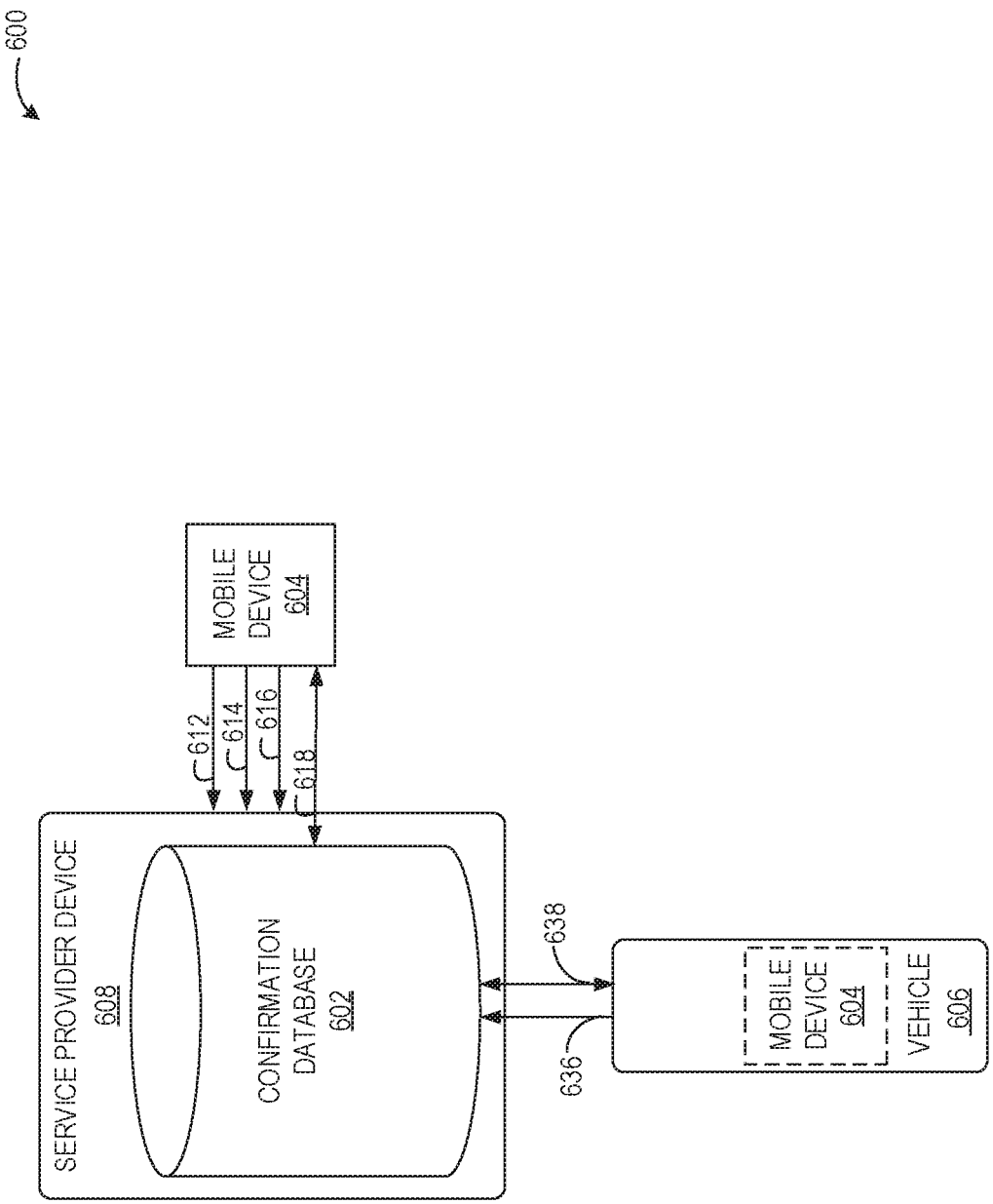

SYSTEMS AND METHODS FOR VEHICLE USE AUTHENTICATION

CROSS REFERENCE TO RELATED APPLICATION

The current application claims priority to U.S. Provisional Patent Application No. 62/891,032, entitled "SYSTEMS AND METHODS FOR VEHICLE USE AUTHENTICATION," filed on Aug. 23, 2019, the contents of which is hereby incorporated by reference in its entirety for all purposes.

BACKGROUND

The disclosure relates to user authentication which may be used in the context of a vehicle.

SUMMARY

As car rentals and car share programs continue to increase in popularity, challenges with the management of vehicle contracts and authenticating users have also increased. In particular, authenticating a user during a contract application process can be labor intensive and time consuming, often requiring manual review. Such contract authentication approaches can create bottlenecks. Further, current approaches for staging or parking rental cars at a control point can make it time consuming to pair a user with a vehicle.

Moreover, even after one or more users are authenticated during the contract application process for use of a vehicle, ensuring that only the contracted one or more users operates the vehicle may present further issues. For example, in some cases, authenticated users may allow users who are not authenticated for operating the vehicle to drive the vehicle. Additionally, a second level of security for vehicles against users who may attempt to spoof current car rental and car share programs is an increasing challenge.

In view of the above, the inventors have recognized a need for removing the manual step of renting a car and increasing security. Thus, the inventors have developed systems and methods to at least partially address the above problems.

In at least one example approach developed by the inventors, a validation image of a user is captured by a vehicle and compared to a confirmation data set. The confirmation data set may be a previously validated data set based on matching a document image and a confirmation image of the user via facial recognition during a contract registration process, such as a car rental contract or car share contract registration process. If the validation image of the user matches the confirmation set image data, then vehicle operability actions may be carried out. Alternatively, if the validation image of the user does not match the confirmation set, then a refusal action is carried out which prevents the vehicle from being operated.

By removing the manual step of renting the car, speed and convenience are achieved, especially as a checkout queue can be eliminated. Security is further increased as the approach disclosed helps to limit the use of vehicles to users authorized by rental agreements and helps to prevent unauthorized users from utilizing rental vehicles.

BRIEF DESCRIPTION OF THE DRAWINGS

FIG. 6 shows an example communication diagram according to at least one example of the present disclosure.

DETAILED DESCRIPTION

Figure 1:
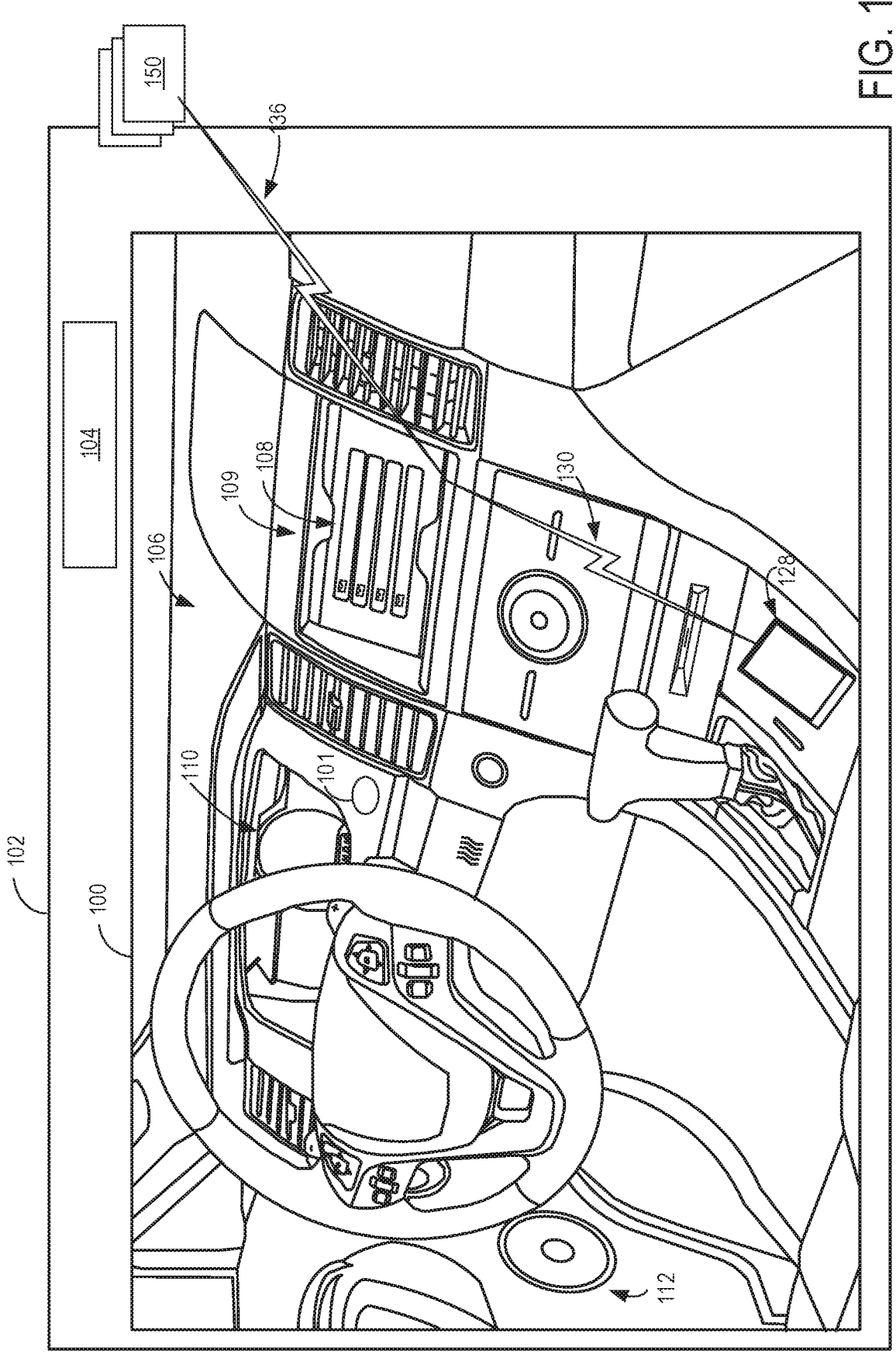
FIG. 1 shows an example partial view of a vehicle cabin in accordance with one or more embodiments of the present disclosure.
Figure 2:
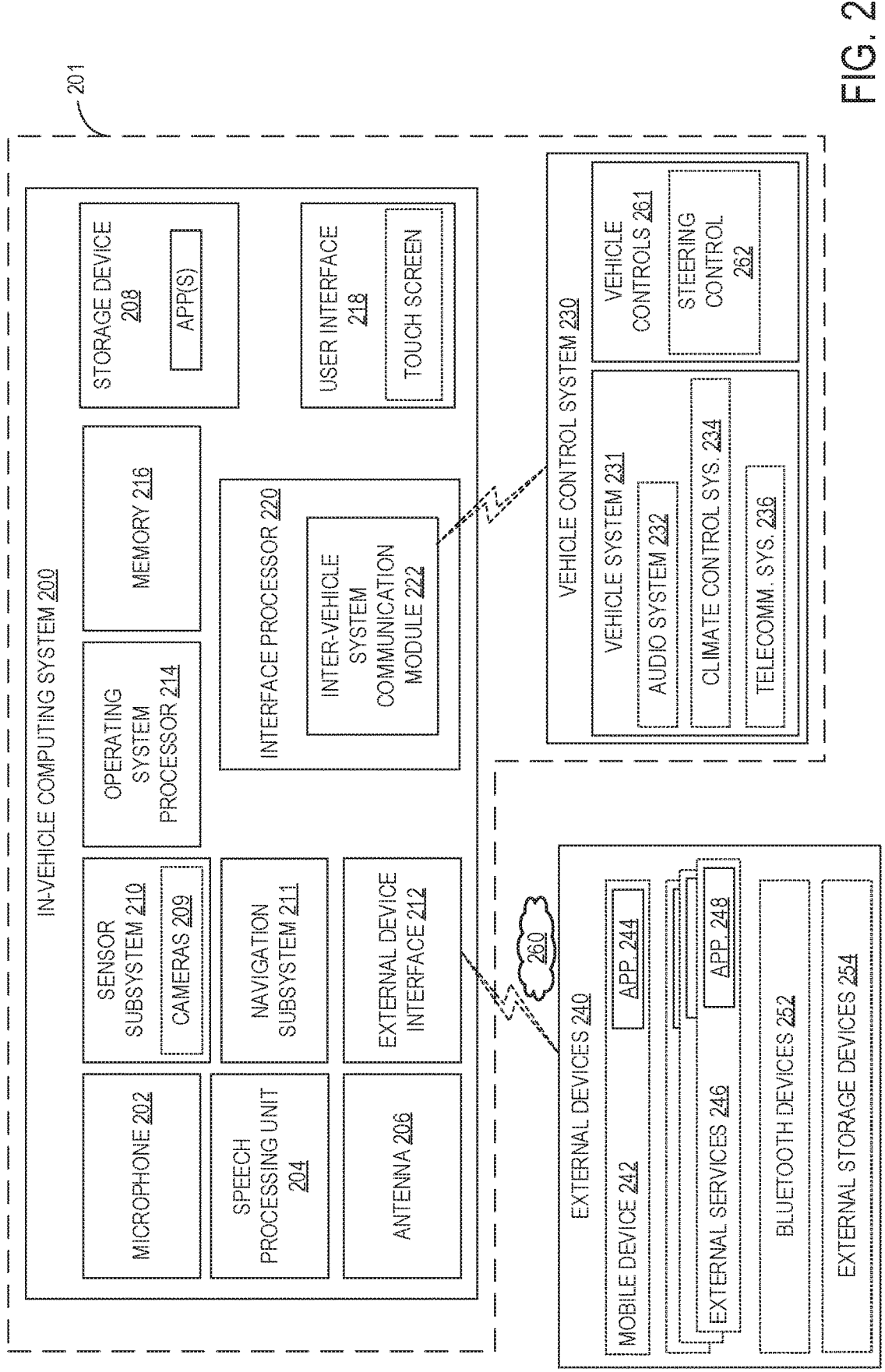
FIG. 2 shows an example in-vehicle computing system in accordance with one or more embodiments of the present disclosure.
Figure 3:
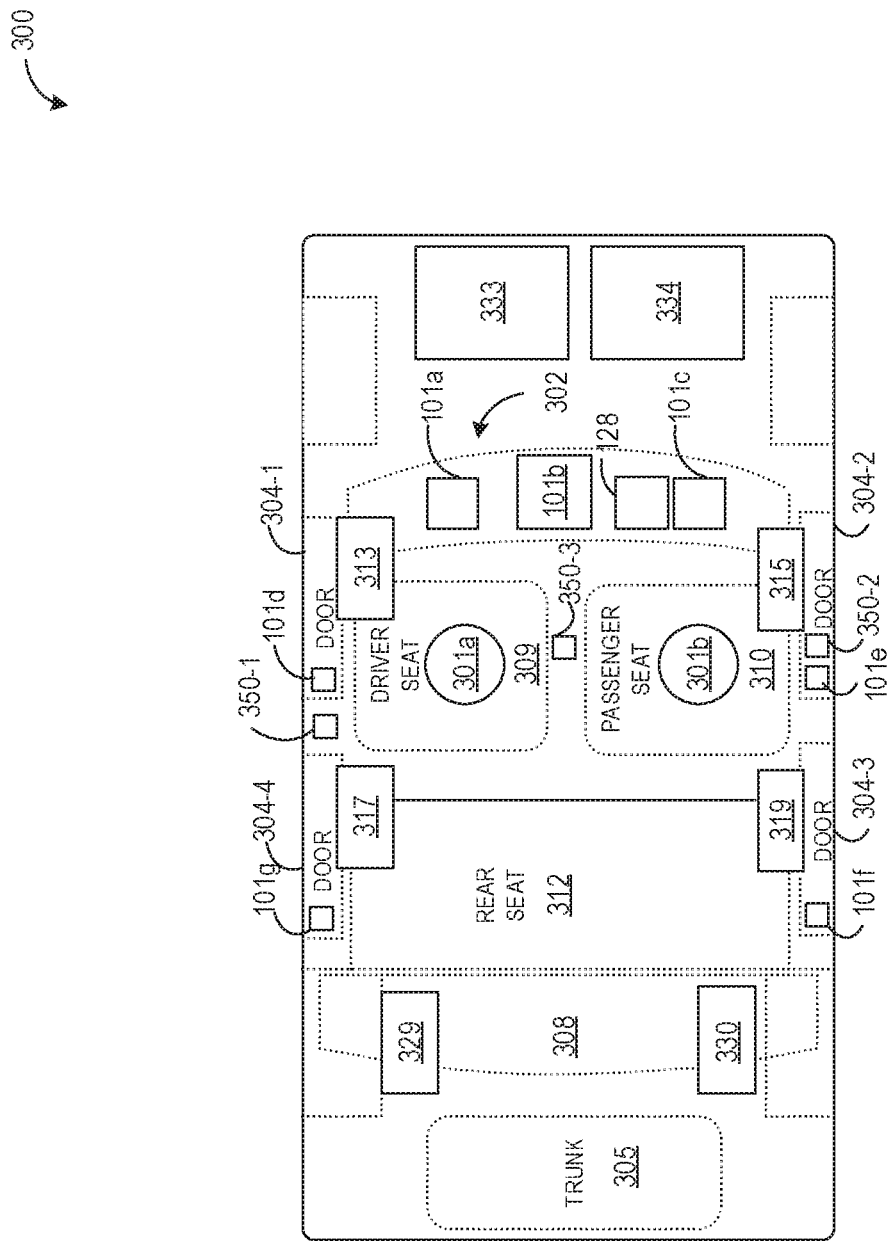
FIG. 3 shows an example vehicle monitoring system in accordance with one or more embodiments of the present disclosure.

As discussed above, the present disclosure relates at least in part to an approach for user authentication for operating a vehicle, such as the vehicles including features shown in FIG. 1, FIG. 2, and FIG. 3. As discussed in FIG. 4A, FIG. 4B, and FIG. 5, a validation image of a user is captured by a vehicle and compared to a confirmation set, where the confirmation set is formed based on matching a document image and a confirmation image of the user via facial recognition. The confirmation set may be stored in a confirmation database, as shown at FIG. 6, for example. If the validation image of the user matches the confirmation set image data, then vehicle operability actions may be carried out. Alternatively, if the validation image of the user does not match the confirmation set, then a refusal action is carried out which prevents the vehicle from being operated.

In at least one example developed by the inventors, using an application on a mobile device that contains facial recognition software, a car sharing service or traditional car rental agency can register a potential user along with a photo of their driver license, name, address, credit card information, etc. The photo of the user's driver license, which may be referred to herein as a document image, is confirmed via a confirmation photo, such as a photo taken within the application. The facial recognition software of the application may be used to validate the user's driver license against the confirmation photo.

Then, the user enters a vehicle, is positioned in the driver seat (that is, sits in the driver seat), and the vehicle identifies the user via facial recognition as the user who rented the vehicle while the user is positioned in the driver seat. Responsive to the vehicle validating the user as the user who rented the vehicle, the vehicle may then be started and driven for a period of time agreed to in the contract. However, if a user who enters a vehicle and is positioned in the driver seat is not validated as the user who rented the vehicle, the vehicle is prevented from starting and being driven. The facial recognition performed by the vehicle may be performed via facial recognition software that is part of a vehicle cabin monitoring software and mobile application, for example.

The inclusion of a two tier facial validation process discussed above advantageously ties the user to the vehicle and minimizes unauthorized users from utilizing rental and car share vehicles. Moreover, improved efficiency may be achieved in comparison to traditional car rental check out processes that may include a human to perform validation of a driver license and ensuring authorized users are paired with rental vehicles. Further, the approach disclosed herein requires three different images of the user to perform validation of the user across two different validation processes for use of a vehicle, which advantageously helps to prevent unauthorized users from utilizing a vehicle.

Turning now to FIG. 1, FIG. 1 shows an example partial view of one type of environment for an audio customization system: an interior of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage. Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. Vehicle 102 may include a fully electric vehicle, incorporating fuel cells, solar energy capturing elements, and/or other energy storage systems for powering the vehicle.

As shown, an instrument panel 106 may include various displays and controls accessible to a driver (also referred to as the user) of vehicle 102. For example, instrument panel 106 may include a touch screen 108 of an in-vehicle computing system 109 (e.g., an infotainment system), an audio system control panel, and an instrument cluster 110. While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output, a distribution of sound among the individual speakers of the vehicle speaker system, an equalization of audio signals, and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128. The mobile device 128 may comprise one or more cameras, in at least one example. The audio system of the vehicle may include an amplifier (not shown) coupled to plurality of loudspeakers (not shown). In some embodiments, one or more hardware elements of in-vehicle computing system 109, such as touch screen 108, a display screen, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc.

Among these sensors, one or more cameras 101 may be included, where the one or more cameras 101 may be utilized to capture images of a user(s) within the cabin 100 or attempting to enter the cabin.

For example, camera 101 may capture images of a user in driver position of the vehicle, wherein the driver position of the vehicle is a position within cabin 100 of vehicle 102 that includes driver controls such as a steering wheel, ignition, brake pedal, and acceleration pedal among other driver control features.

In some examples, a positioning of camera 101 may be adjustable. Such adjustability of the camera 101 may advantageously allow for positioning of the camera 101 to be adjusted so that the camera 101 has an increased range for capturing facial images. In at least one example, such adjustability may be advantageous to allow for capturing facial images of users of various heights. Adjustability of a position of the camera 101 may be able to capture facial images of one or more users within the cabin 100. For example, camera 101 may be adjusted to better capture facial image of a user in a driver seat and a user in a passenger seat.

Additionally or alternatively, camera 101 may further include a lens that is a wide angle lens. The inclusion of a wide angle lens for camera 101 may be advantageous to increase a range of capture. It is noted that in cases where the camera 101 includes a wide angle lens, adjustment processes may be performed after capturing a facial image to correct for any distortions prior to performing facial recognition processes.

Other parameters of the camera 101 may further be adjustable in order to facilitate facial imaging processes. For example, one or more of a light sensitivity (e.g., ISO), shutter speed, aperture, depth of field, white balance, and exposure compensation may be adjusted. Such parameters of camera 101 may be automatically adjusted to ensure sufficient facial information is captured for evaluation purposes.

Parameters of the camera 101 may be automatically adjusted to ensure that predetermined facial data needed to perform facial recognition is captured. In at least one example, the predetermined facial data needed to perform the facial recognition may be particular facial features. For example, the predetermined facial data points may include one or more facial features such as one or more of a user's eyes, nose, mouth, and ears. The predetermined facial data points may additionally or alternatively include a face shape and hairline, for example.

Additionally or alternatively, the predetermined facial data needed to perform the facial recognition may be an estimated percentage of a user's face. That is, a percentage of a user's face within view of the camera 101 may be estimated. Such estimation may be based on one or more of identified facial features. For example, if two eyes, a nose, and two ears are identified within a captured facial image, then a corresponding estimation as to how much of the user's face has been captured may be made. If the estimated percentage of a user's face captured is greater than a predetermined percentage threshold, then the captured facial image will be determined as suitable for use in performing facial recognition. If the estimated percentage of a user's face captured is determined to be less than or equal to the predetermined percentage threshold, then the captured facial image will be determined as not suitable for use in performing facial recognition. If the captured facial image is determined as not suitable for use in performing facial recognition, then the camera may be automatically be operated to re-capture the facial image. This process of operating the camera to capture a facial image(s) of the user may be automatically repeated until a facial image of the user is captured that is suitable for use in performing facial recognition (e.g., the facial image captured is greater than the predetermined percentage threshold). Or, in at least one example, the facial image(s) capturing process may only be automatically repeated until a threshold number of failed facial capturing processes reaches a threshold.

For example, a facial capturing process may be determined to fail responsive to failing to capture a facial image with greater than the predetermined percentage threshold. If the facial capturing process has been determined to fail greater than a threshold number of times, then the facial capturing process may be terminated and a re-capturing of the facial image may not be initiated. As an example, a threshold number of times for failed facial capturing processes may be three. In such cases, responsive to the facial capturing process failing a first time, a first facial image re-capture may carried out automatically. If the facial capturing process fails a second time with the first re-captured facial image, then a second facial re-capture may be carried out as part of a third facial capturing process. If the facial capturing process fails a third time with the second re-captured facial image, then the facial capturing process may be terminated. It is noted that terminating the facial capturing process may include not automatically controlling the camera to take another facial capture image. In at least one example, terminating the facial capturing process may include providing a notification on a mobile device and/or user interface of the vehicle providing of facial capture failure. The facial capture failure notification may include a prompt requesting whether to re-attempt a facial capture process, in at least one example.

Additionally, in some examples, both the estimated threshold percentage of a user's face must be captured in combination with one or more required facial features captured in order to utilize the captured facial image for facial recognition. As an example, a user's eyes may be required in order for a captured facial image to be utilized for performing facial recognition, regardless of the estimated percentage of the user's face in the captured facial image.

Camera 101 is shown positioned on instrument panel 110, though other positioning of camera 101 is contemplated. For example, camera 101 may be positioned adjacent a rear view mirror, integrated into a steering wheel, incorporated into a dash, coupled to a cabin ceiling, or facing outward at a door of the vehicle to monitor entry into the vehicle, among other possible positions.

It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. For example, by including a camera on an external surface of the vehicle (outside a cabin of the vehicle), a user may undergo an authentication process before being allowed to gain entry into the cabin of the vehicle. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct, Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above). The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc. External devices 150 may be connected to the in-vehicle computing system via communication link 136 which may be wired or wireless, as discussed with reference to communication link 130, and configured to provide two-way communication between the external devices and the in-vehicle computing system. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, and/or other input sources and select settings for various in-vehicle systems (such as climate control system or audio system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and then transmitted to in-vehicle computing system 109 and touch screen 108 via communication link 136/130.

FIG. 2 shows a block diagram of an in-vehicle computing system 200 configured and/or integrated inside vehicle 201. In-vehicle computing system 200 may be an example of in-vehicle computing system 109 of FIG. 1 and/or may perform one or more of the methods described herein in some embodiments. Additionally or alternatively, in-vehicle computing system 200 may be an example of an in-vehicle computing system for vehicle 300 of FIG. 3. In some examples, the in-vehicle computing system may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 201 in order to enhance an in-vehicle experience for a driver and/or a passenger.

In-vehicle computing system 200 may include one or more processors including an operating system processor 214 and an interface processor 220. Operating system processor 214 may execute an operating system on the in-vehicle computing system, and control input/output, display, playback, and other operations of the in-vehicle computing system. Interface processor 220 may interface with a vehicle control system 230 via an inter-vehicle system communication module 222.

Inter-vehicle system communication module 222 may output data to other vehicle systems 231 and vehicle control elements 261, while also receiving data input from other vehicle components and systems 231, 261, e.g. by way of vehicle control system 230. When outputting data, inter-vehicle system communication module 222 may provide a signal via a bus corresponding to any status of the vehicle, the vehicle surroundings, or the output of any other information source connected to the vehicle. Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). For example, the in-vehicle computing system may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 200 to store data such as instructions executable by processors 214 and 220 in non-volatile form. The storage device 208 may store application data to enable the in-vehicle computing system 200 to run an application for connecting to a cloud-based server and/or collecting information for transmission to the cloud-based server. The application may retrieve information gathered by vehicle systems/sensors, input devices (e.g., user interface 218), devices in communication with the in-vehicle computing system (e.g., a mobile device connected via a Bluetooth link), etc. In-vehicle computing system 200 may further include a volatile memory 216. Volatile memory 216 may be random access memory (RAM). Non-transitory storage devices, such as non-volatile storage device 208 and/or volatile memory 216, may store instructions and/or code that, when executed by a processor (e.g., operating system processor 214 and/or interface processor 220), controls the in-vehicle computing system 200 to perform one or more of the actions described in the disclosure.

A microphone 202 may be included in the in-vehicle computing system 200 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 200 may also be able to receive voice commands and sample ambient vehicle noise using a microphone included in an audio system 232 of the vehicle.

One or more additional sensors may be included in a sensor subsystem 210 of the in-vehicle computing system 200. The sensor subsystem may include instructions stored in non-transitory memory that are executable by a processor to carry out one or more of the functions described herein.

For example, the sensor subsystem 210 may include one or more cameras 209, such as a rear view camera for assisting a user in parking the vehicle and/or a camera for identifying a user (e.g., using facial recognition and/or user gestures via artificial intelligence stored in the sensor subsystem). For example, the cameras 209 may include camera 101 as shown in FIG. 1 and cameras of the monitoring system 302 in FIG. 3. The cameras 209 may be actuated via the sensor subsystem when capturing facial image samples. For example, the cameras 209 may be actuated to obtain a facial image of one or more users within a vehicle cabin. In at least one example, actuating the cameras 209 to obtain a facial image of one or more users within a vehicle cabin may include actuating one or more of cameras 101. In particular, actuation of the cameras 209 to obtain a facial image of one or more users within a vehicle cabin may be carried out as part of a validation step to authorize vehicle use. In such examples, the facial image may be carried out to ensure that at least a predetermined number of facial data points are captured. As discussed above, ensuring that the predetermined number of facial data points are capture when obtaining the facial image helps to improve an accuracy during use of the facial image for validation purposes.

Sensor subsystem 210 of in-vehicle computing system 200 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230. A navigation subsystem 211 of in-vehicle computing system 200 may generate and/or receive navigation information such as location information (e.g., via a GPS sensor and/or other sensors from sensor subsystem 210), route guidance, traffic information, point-of-interest (POI) identification, and/or provide other navigational services for the driver.

External device interface 212 of in-vehicle computing system 200 may be coupleable to and/or communicate with one or more external devices 240 located external to vehicle 201. While the external devices are illustrated as being located external to vehicle 201, it is to be understood that they may be temporarily housed in vehicle 201, such as when the user is operating the external devices while operating vehicle 201. In other words, the external devices 240 are not integral to vehicle 201. The external devices 240 may include a mobile device 242 (e.g., connected via a Bluetooth, NFC, WIFI direct, or other wireless connection) or an alternate Bluetooth-enabled device 252. Mobile device 242 may be a mobile phone, smart phone, wearable devices/sensors that may communicate with the in-vehicle computing system via wired and/or wireless communication, or other portable electronic device(s).

Other external devices include external services 246. For example, the external devices may include extra-vehicular devices that are separate from and located externally to the vehicle. In at least one example, external services 246 may include confirmation database 502 (shown in FIG. 5) stored thereon. Still other external devices include external storage devices 254, such as solid-state drives, pen drives, USB drives, etc. External devices 240 may communicate with in-vehicle computing system 200 either wirelessly or via connectors without departing from the scope of this disclosure. For example, external devices 240 may communicate with in-vehicle computing system 200 through the external device interface 212 over network 260, a universal serial bus (USB) connection, a direct wired connection, a direct wireless connection, and/or other communication link. Each of the external devices 240 may comprise a processor and instructions store in non-transitory memory that are executable by the processor for carrying out various actions.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct, as described in more detail below.

One or more applications 244 may be operable on mobile device 242. As an example, mobile device application 244 may be operated, so that the mobile device application 244 communicates with in-vehicle computing system 200 to initiate a facial imaging process within vehicle 201. The facial imaging may be carried out via cameras 209 of the sensor subsystem 210. As discussed above, capturing the facial image may include adjusting one or more camera parameters (e.g., parameters of camera 101) to ensure at least a predetermined number of facial data points are captured. These camera parameters may include any one or more of the camera parameters discussed above with reference to FIG. 1, for example. The predetermined number of facial data point may be a minimum number of data points to achieve a minimum threshold of recognition certainty. That is, the predetermined number of facial data.

The collected data may be transferred by application 244 to external device interface 212 over network 260. In addition, specific user data requests may be received at mobile device 242 from in-vehicle computing system 200 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, amplifier etc.) or other applications (e.g., navigational applications) of mobile device 242 to enable the requested data to be collected on the mobile device or requested adjustment made to the components. Mobile device application 244 may then relay the collected information back to in-vehicle computing system 200.

Likewise, one or more applications 248 may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of vehicle audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers. Vehicle audio system 232 may be passive or active such as by including a power amplifier. In some examples, in-vehicle computing system 200 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 201. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers of the vehicle's audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc. Likewise, the control signals may control vents, air conditioner, and/or heater of climate control system 234. For example, the control signals may increase delivery of cooled air to a specific section of the cabin.

Control elements positioned on an outside of a vehicle (e.g., controls for a security system) may also be connected to computing system 200, such as via communication module 222. The control elements of the vehicle control system may be physically and permanently positioned on and/or in the vehicle for receiving user input. In addition to receiving control instructions from in-vehicle computing system 200, vehicle control system 230 may also receive input from one or more external devices 240 operated by the user, such as from mobile device 242. This allows aspects of vehicle systems 231 and vehicle controls 261 to be controlled based on user input received from the external devices 240.

In-vehicle computing system 200 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. The in-vehicle computing system may also receive wireless commands via FR such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 240 (such as to mobile device 242) via external device interface 212.

One or more elements of the in-vehicle computing system 200 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of the in-vehicle computing system 200 and mobile device 242 via user interface 218. In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

FIG. 3 is a block diagram of a vehicle 300 that includes an example monitoring system 302 that includes one or more cameras 101a, 101b, 101c, 101d, 101e, 101f, 101g. Cameras 101a, 101b, and 101c may be referred to herein as in-cabin cameras, in at least one example. The monitoring system may be controlled via a vehicle sensor subsystem, such as the cameras 209 subsystem, as discussed in FIG. 2. The vehicle 300 may be an example of vehicle 102 of FIG. 1. The vehicle 300 includes doors 304, a driver seat 309, a passenger seat 310, and a rear seat 311. Each of doors 304 may include a door locked. When the doors 304 are locked they may be referred to as in a locked state. When the doors 304 are unlocked, they may be referred to as in an unlocked state. While a four-door vehicle is shown including doors 304-1, 304-2, 304-3, and 304-4, the monitoring system 302 may be used in vehicles having more or fewer doors. One or more users 301a, 301b may be positioned within the vehicle 300. The vehicle 300 may be an automobile, truck, boat, or the like. The vehicle 300 may include one or both of an engine 333 and a motor 334. Engine 333 may be an internal combustion engine, in at least one example. Although only one rear seat is shown, larger vehicles may have multiple rows of rear seats. Smaller vehicles may have only one or more seats. While a particular example configuration is shown, other configurations may be used including those with fewer or additional components.

The monitoring system 302 may advantageously be utilized for user verification prior to enabling operation of the vehicle. For example, as detailed below, monitoring system 302 may advantageously be used as a verification step for a contract, such as a car rental contract or a car share contract, to help ensure that the correct user is driving the car. The monitoring system 302 may be utilized to form a validation image of a user, and the validation image may be compared to image data of users associated with contracts via facial recognition. If the validation image is a match to image data for a user associated with a contract that authorizes use of the vehicle, then vehicle operability may be enabled. Otherwise, if the validation image does not match image data for a user associated with a contract that authorizes use of the vehicle, vehicle operability may be prevented.

In addition to monitoring system 302, the vehicle may include surround speakers. Such surround speakers may include a left side speaker (LS speaker) 317 and a right side speaker (RS speaker) 319, a left rear speaker (LR speaker) 329 and a right rear speaker (RR speaker) 330, or a combination of speaker sets. Other speaker sets may be used. While not shown, one or more dedicated subwoofers or other drivers may be present. Possible subwoofer mounting locations include the trunk 305, below a seat, or the rear shelf 308. The vehicle 300 may also have one or more microphones 350 mounted in the interior.

Each FL speaker, FR speaker, LS speaker, RS speaker, LR speaker, and RR speaker may include one or more transducers of a predetermined range of frequency response such as a tweeter, a mid-range, or a woofer. The tweeter, mid-range, or woofer may be mounted adjacent to each other in essentially the same location or in different locations. For example, the FL speaker 313 may be a tweeter located in door 304-1 or elsewhere at a height roughly equivalent to a side mirror or higher. The FR speaker 315 may have a similar arrangement to FL speaker 313 on the right side of the vehicle (e.g., in door 304-2).

The LR speaker 329 and the RR speaker 330 may each be a woofer mounted in the rear shelf 308.

Figure 4A:
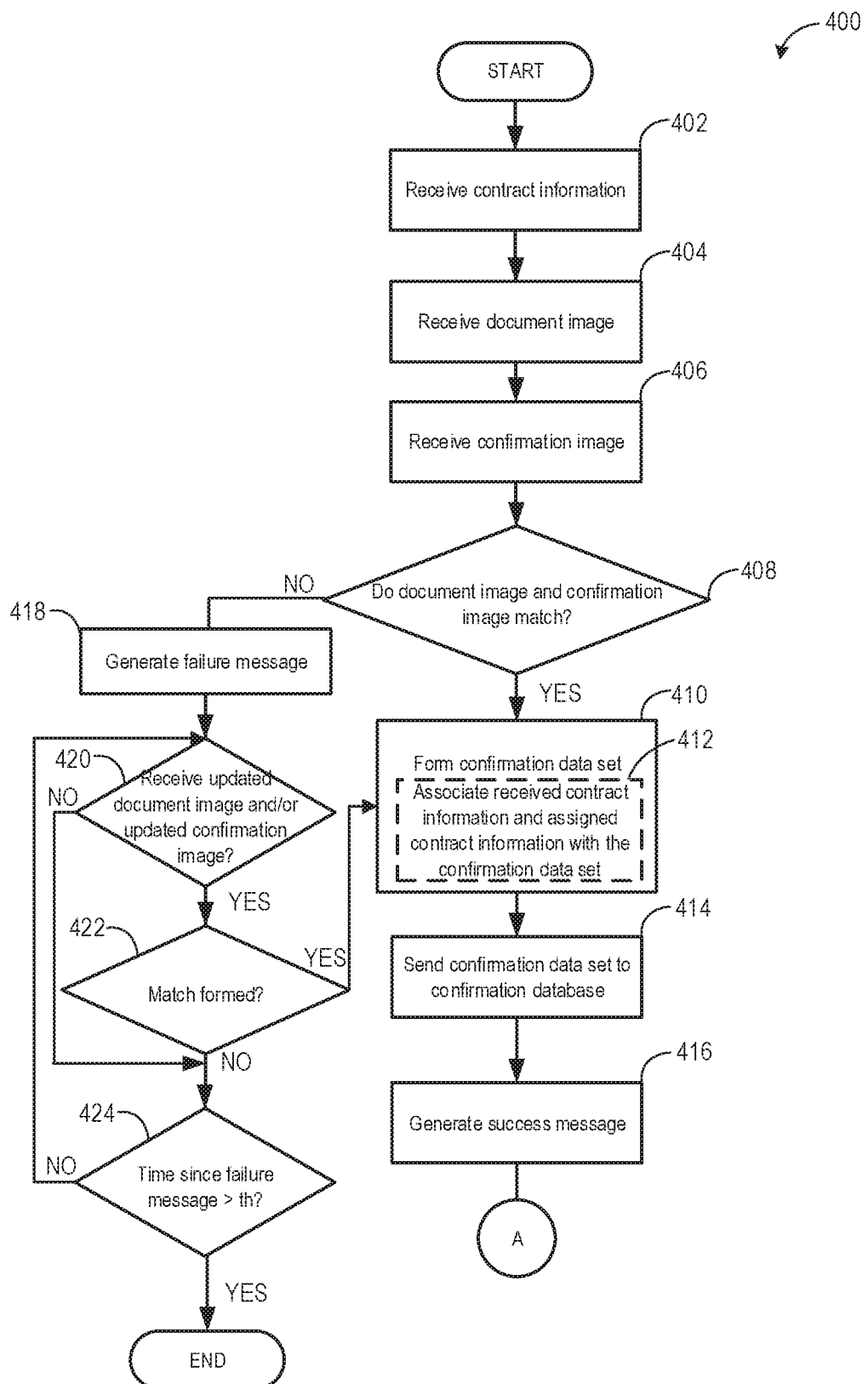
FIG. 4A and FIG. 4B show a flow chart of a method according to at least one example of the present disclosure.

Turning now to FIG. 4A, FIG. 4A shows a flow chart of a method 400 according to at least one example of the present disclosure. In at least one example, the methods disclosed herein (for example, methods 400 and 500) may be stored as instructions on a non-transitory storage devices, such as non-volatile storage device 208 and/or volatile memory 216 that are executable by a processor (e.g., one or more of an operating system processor 214, interface processor 220, and a processor of one or more of the external devices 240) to perform one or more of the actions described in the disclosure.

For example, the instructions stored may be executable by an external device processor to generate a set of confirmation data responsive to validating a match between a document image and a confirmation image of a user that are being used to verify a contract. The instructions stored may additionally or alternatively be executable by the operating system processor and/or the interface processor of a vehicle to perform an user facial scan (via one or more cameras 101, for example), compare a facial image from user facial scan to confirmation data stored in a confirmation database, and perform refusal actions (prevent vehicle start even if start request received and/or maintain vehicle door(s) in a locked state, for example) or vehicle operability actions (allow vehicle start and/or unlock vehicle door(s), for example) based on the comparison. It is further noted that one or more of the steps disclosed in method 500 may be used additionally or alternatively to the steps disclosed in method 400.

Turning first to step 402, step 402 includes receiving contract information. The contract information may be car rental contract information or a car share agreement, for example. Such contract information may include one or more of a user name, a user address, and user credit card information. Additionally, details as to one or more of a user preferred duration of the contract, user preferred car insurance, additional driver requests, and user preferred type of car may also be entered.

The contract information may be received via an application of a mobile device. Such an application may be the secure vehicle application discussed in FIG. 5, for example. Additionally or alternatively, the contract information may be received via another computing device such as a tablet or a personal computer.

Following step 402, method 400 includes receiving a document image at step 404. In at least one example, the document image may be a photo of a driver license. Additionally or alternatively, the document image may be a photo of a passport or other form of government identification that includes an image of the user. Similar to receiving the contract information, the document image may be received via the application of the mobile device, where the application may be the secure vehicle application discussed in FIG. 5, for example. Additionally or alternatively, the contract information may be received via another computing device such as a tablet or a personal computer.

In at least one example, the document image may be provided via a camera of the mobile device. In examples where the document image may be provided via the camera of the mobile device and in which the document image is received via the application on the mobile device, the application may have an integrated prompt to add a photo for the document image from a local photo album on the mobile device or to take a photo for the document image in real-time.

If the integrated prompt is to add the photo for the document image by taking the photo for the document image in real-time, then a photo viewer with the ability to operate a camera of the mobile device within the application may be provided. However, alternatively, a separate digital camera, camera of a computing device, or camera of a tablet may be used to form the document image. It is further noted that the document image may be required to be used as a reference image for calculating predetermined facial data points and/or estimating amount of a user's face discussed in relation to FIG. 1. In this way, the document image may be utilized as a reference against a confirmation image for matching purposes, for example.

Following step 404, method 400 includes receiving a confirmation image at step 406. The confirmation image is an image of a user to validate the document image received at step 404 via facial recognition. That is, the confirmation image is an image of the user that is used to validate the document image received at step 404. In at least one example, the confirmation image may be a photo of a user taken via the mobile device. For example, similar to step 404, in at least one example the application may have an integrated prompt to add a photo for the confirmation image from a local photo album on the mobile device or to take a photo for the image in real-time. If the integrated prompt is to add the photo for the confirmation image in real-time, then a photo view with the ability to operate a camera of the mobile device within the application may be provided. However, alternatively, a separate camera, such as a digital camera, camera of a computing device, or camera of a tablet may be used to form the confirmation image. It is further noted that the confirmation image may be required to include the predetermined facial data points and/or estimated amount of a user's face discussed in relation to FIG. 1 to be utilized as the confirmation image for matching purposes.

Moving to step 408 of method 400, step 408 includes confirming whether the document image and the confirmation image match. That is, step 408 includes validating whether the user in the document image is the same user as in the confirmation image. Such confirmation at step 408 may be performed via performing facial recognition to compare the user in the document image to the user in the confirmation image. The facial recognition at step 408 may be performed via one or more of the application of the mobile device and a service provider device. For example, the service provider device 608 shown at FIG. 6 may perform the facial recognition. Thus, put another way, step 408 comprises performing a first validation based on the document image and the confirmation image via facial recognition.

If the document image and the confirmation image are determined to be a match with greater than a threshold amount of certainty, the document image and the confirmation are determined to match (e.g., "YES").

The threshold amount of certainty may be based on an amount that the document image and the confirmation image match. For example, facial data points for each of the document image and the confirmation image may be compared to one another to determine an amount of overlap between the document image and the confirmation image. These facial data points may include facial features and positioning. In one or more examples, certain facial data points may be weighted more heavily for the amount of overlap than other facial data points. For example, facial features which are generally unique from person to person and that are less likely to change over time may be weighted more heavily towards determining the overlap between the document image and the confirmation image.

In contrast, facial features which may not be as unique from person to person and that are more likely to change over time may have less weight in determining overlap between the document image and the confirmation image. In at least one example, the threshold amount of certainty may be greater than 99% certainty. In some examples, the threshold amount of certainty may be greater than 98% certainty or greater than 95% certainty.

If the document image and the confirmation image are determined to match at step 408, then method 400 includes forming a confirmation data set at step 410. The confirmation data set may include any one or more of the document image, the confirmation image, and a composite of the document image and the confirmation image (also referred to herein as an aggregate image). As part of forming the confirmation data set, the confirmation data set may be associated with contract information at step 412. For example, the confirmation data set may be associated with the contract information received at step 402.

Moreover, forming the confirmation data set at step 410 may include assigning contract parameters. That is, although the contract information at step 412 may have included user preferred contract details, one or more of these details may not be available, such as a car type. Thus, assigning contract parameters at step 410 may include assigning contract parameters such as a specific car or car type, and associating the assigned contract information with the confirmation data set at step 412 that is available for use. The confirmation data set may be formed at the mobile device, such as via the application, in at least one example. Alternatively, the confirmation data set may be formed via a service provider device, such as the server provider device 608 shown in FIG. 6. Further, as another alternative, the confirmation data set may be formed via another computing device or a tablet, for example.

Following steps 410 and 412, method 400 includes sending the confirmation data set to a confirmation database at step 414. The confirmation database may be remote from the mobile device in at least one example. For example, the confirmation database may be a database managed via a service provider. Thus, the confirmation database may be stored on a service provider device. For example, the confirmation database may be a database such as confirmation database 602, shown in FIG. 6. The confirmation database may store additional confirmation data sets to the confirmation data set sent to the confirmation database at step 414.

Figure 4B:
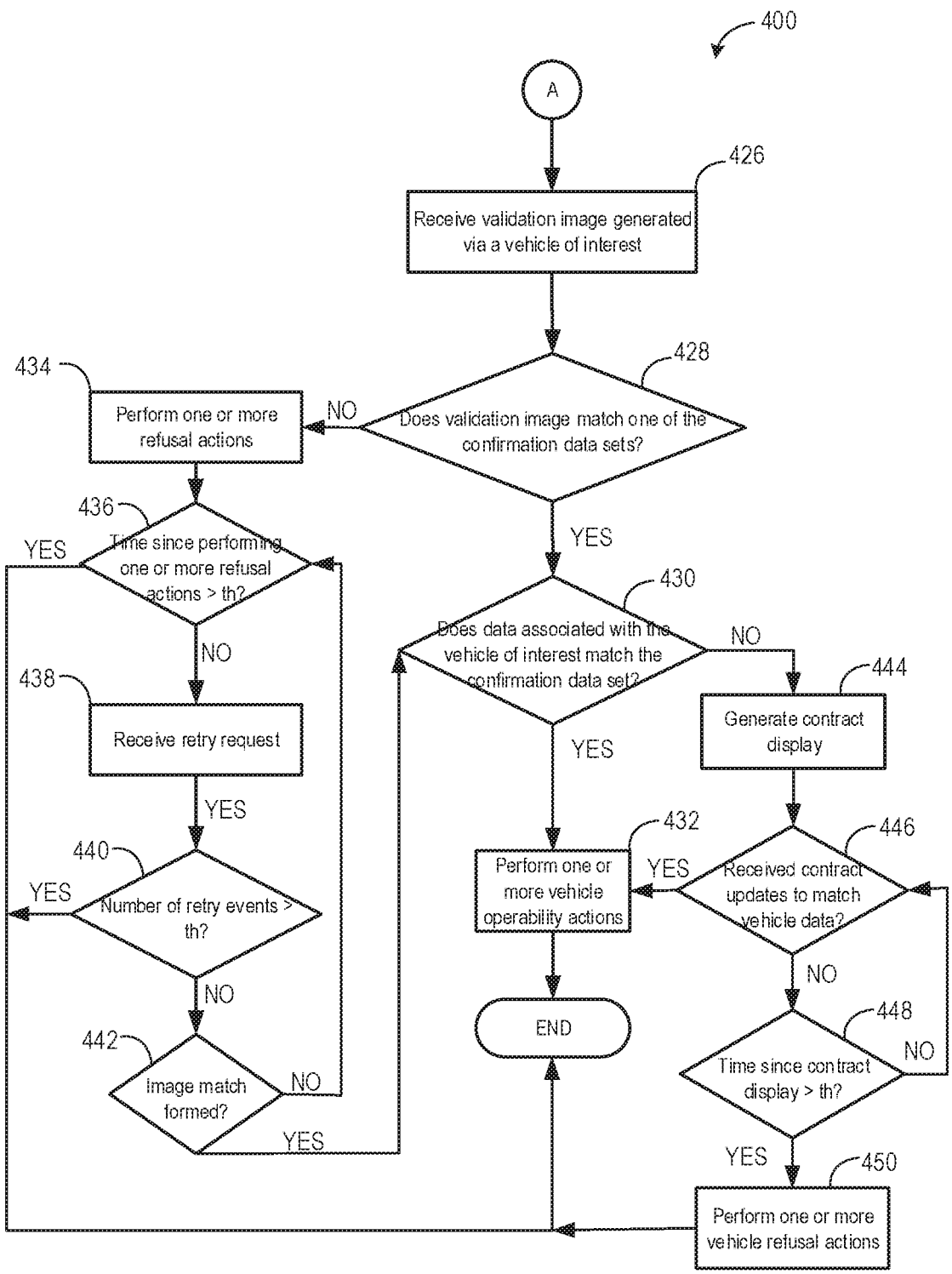

Once the confirmation data set is sent to the confirmation database at step 414, method 400 includes generating a success message at step 416. The success message may be a display provided on the mobile device, such as via the application. The success message may additionally or alternatively include an email message, text message, or other form of communication to the user. The success message may include details as to the contract, including one or more of the received contract information and the assigned contract information. For example, the success message may include a specific car or car type assigned to the user for their contract, as well as details such as a location of pick-up for the specific car or car type, the duration of the contract, etc. It is noted that in examples where a specific car is assigned, one or more of the car model, license plate number, or other specific car designation may be provided. Such a specific car designation may be a unique ID assigned to the car by a car dealership, in at least one example. In examples where only the car type is assigned, one or more of a car size and a car class may be provided. For example, car sizes may include one or more of compact, mid-size, and large designations. Additionally or alternatively, car sizes may be include a number of passengers and/or bags that the car can accommodate. Example car types may include various designations, including one or more of economy, intermediate, premium, and luxury. Additionally or alternatively, example car types may include compact and full size. Other potential car types may additionally or alternatively include standard, SUVs, trucks, vans, convertibles, sporty, exotic, hybrid, and electric cars. Following step 416, method 400 moves to step 426 shown at FIG. 4B. The transition between FIG. 4A and FIG. 4B is indicated by connector "A."

Moving back to step 408, however, if the document image and the confirmation image are not determined to be a match, then method 400 moves to step 418. That is, if the document image and the confirmation image have less than the threshold overlap, and thus less than the threshold amount of certainty of being a match, the document image and the confirmation are determined not to match (e.g., "NO").

Following step 416, a failure message is generated at step 418. The failure message may be a display provided on the mobile device, such as via the application. The failure message may additionally or alternatively include an email message, text message, or other form of communication to the user. The failure message may indicate that the document image and the confirmation do not match. Additionally, the failure message may provide a prompt for the user to provide an updated document image and/or updated confirmation image.

At step 420, if one or more of an updated document image and an updated confirmation are received (e.g., "YES"), then method 400 moves to step 422 to determine whether a match is formed with the updated images. The determination as to whether a match is formed at step 422 may be similar to that described in relation to step 408, for example. If a match is not formed at step 422 (e.g., "NO"), then method 400 proceeds to step 424 determine whether an amount of time since generating the failure message has exceeded a predetermined threshold. If not, (e.g., "NO"), then method 400 moves back to step 420 to continue monitoring for one or more of an updated image and/or updated confirmation image.

If neither an updated document image nor an updated confirmation are received at step 420 (e.g., "NO"), and the amount of time since generating the failure message exceeds the predetermined threshold (e.g., "YES" at step 424), then method 400 ends.

Turning to FIG. 4B, FIG. 4B shows a further flow chart of the method 400 according to at least one example of the present disclosure. As mentioned above, following step 416 of method 400 shown in FIG. 4A, the method moves to step 426. The connection between FIG. 4A and FIG. 4B is illustrated via connector "A."

Step 426 of method 400 includes receiving a validation image generated via a vehicle of interest.

In at least one example, the validation image may be a facial image of a user in a driver seat of the vehicle of interest. Additionally or alternatively, the validation image may be a facial image of a user requesting to unlock the vehicle of interest. The request to unlock the vehicle may be provided via an application on a mobile device, such as described above. Additionally or alternatively, the request to unlock the vehicle may be provided via a user pulling on a handle of a locked door of the vehicle of interest.

In at least one example, the validation image may be generated via the sensor subsystem of the vehicle. For example, the cameras of the sensor subsystem of the vehicle may be utilized to capture the facial image of the user and form the validation image.

The validation image may be generated responsive to receiving a user input to start the vehicle of interest, in one or more examples. The user input to start the vehicle of interest may include pushing of a start button of the vehicle or insertion of a key into an ignition of the vehicle. Additionally or alternatively, the validation image may be generated responsive to receiving a user input to access a lock box of the vehicle or to unlock a door of the vehicle of interest. The lock box of the vehicle may maintain a key in at least one example.

It is noted that the validation image may be required to include the predetermined facial data points and/or estimated amount of a user's face discussed in relation to FIG. 1 to be utilized as the confirmation image for matching purposes.

Following step 426, method 400 includes determining whether the validation image matches one of the confirmation data sets in the confirmation database at step 428. That is, step 426 includes performing a second validation based on the validation image and image data from one or more confirmation sets. For example, 428 may include running a query of the confirmation database to determine whether the validation image matches any of the confirmation data sets stored in the confirmation database. The query may include sending the validation image from the vehicle to an application, such as the application discussed above on the mobile device. Additionally or alternatively, the query may include sending the validation image from the vehicle to a service provider device. For example, the validation image may be sent from the vehicle service provider device 608.

The validation image may be determined to match a confirmation data set stored in the confirmation database based on a comparison of the validation image to one or more of a document image, a confirmation image, and a composite image of the confirmation data set. The process for determining a match between the validation image and the one or more of the document image, the confirmation image, and the composite image of the confirmation data set may be carried out in a manner similar as described in relation to step 408, for example.

If the validation image is determined to match the confirmation data at step 428 (e.g., "YES"), then method 400 moves to step 430 at which it is determined whether data associated with the vehicle of interest matches confirmation data of the confirmation data set. That is, step 430 includes determining whether the data associated with the vehicle of interest matches the received contract information and assigned contract information included in the confirmation data set. In particular, parameters of the vehicle of interest that may be compared to the confirmation data set include the type and class of the vehicle, for example.

If the data associated with the vehicle of interest matches the confirmation data set at step 430 (e.g., "YES"), then method 400 includes performing one or more vehicle operability actions at step 432.

In at least one example, the one or more vehicle operability actions at step 432 may include at least one of starting the engine (e.g., combustion engine 333), starting an electric motor of the vehicle (e.g., motor 334), and enabling a key to be turned in an ignition of the vehicle. Such examples may include cases where the validation image is generated responsive to a user input to start the vehicle.

Additionally or alternatively, the one or more vehicle operability actions at step 432 may include at least one of unlocking a lock box and unlocking at least one door of the vehicle. Such examples may include cases where the validation image is generated responsive to a user attempting to enter the cabin of the vehicle of interest.

Moreover, in at least one example, the one or more vehicle operability actions at step 432 may include providing a code to a user. For example, the code may be sent to the user via the mobile device. In some examples, the code may be displayed via the application of the mobile device. Additionally or alternatively, the code may be provided via one or both of text message and email. The code provided to the user may be entered at a user interface of the vehicle for one or more of vehicle entry and to start the vehicle. For example, the code may be provided to user interface at the door of the vehicle. As another example, the code may be entered into an infotainment system of the vehicle via a touchscreen. Following step 432, method 400 may end.

Moving back to step 430, if the data associated with the vehicle of interest does not match the confirmation data set at step 430 (e.g., "NO"), then method 400 includes generating a contract display at step 444. The contract display at step 444 may provide information from the confirmation data set associated with the user, such as the assigned car type or car class for the contract. In at least one example, the contract display may further provide one or more locations of vehicle(s) that satisfy the contract conditions. The contract display provided at step 444 includes an option to update the contract.

At step 446, method 400 includes determining whether updates to the contract have been received so that the confirmation data set that has been matched to the validation image now matches the vehicle data for the vehicle of interest. For example, step 446 includes monitoring the contract to determine whether one or more of a duration, authorized drivers on the contract, and car type have been updated so that the vehicle of interest may be used by the user.

If updates have been received so that the confirmation data set that was matched to the validation image also matches vehicle data for the vehicle of interest (e.g., "YES"), method 400 moves to step 432 and then ends.

Alternatively, if updates have not been received to match the confirmation data set to the vehicle of interest (e.g., "NO"), then method 400 moves to step 448. At step 448, it is determined whether an amount of time since the contract display was generated has exceeded a threshold time. If not, (e.g., "NO"), then method 400 proceeds to 446. If the time since the contract display was generated has exceeded the threshold time (e.g., "YES"), then method 400 moves to step 450 to perform one or more vehicle refusal actions.

The one or more vehicle refusal actions at step 450 may include one or more of preventing an engine start, creating an alert to send to a service provider device, maintaining a lock box locked, and maintaining the vehicle of interest in a locked state. It is noted that maintaining the vehicle of interest in the locked state may include maintaining one or more doors of the vehicle in a locked state, for example. The alert to the service provider device may provide a message notifying the service provider device via a display of an attempted entry to the vehicle of interest. The alert may further include creating a flag in the confirmation data set of the user for future confirmation database queries. Following step 450, method 400 may end.

Moving back to step 428, as discussed-above, step 428 includes determining whether the validation image matches one of the confirmation data sets stored at the confirmation database at step 428. As mentioned, step 428 may include running a query of the confirmation database to determine whether the validation image matches any of the confirmation data sets stored in the confirmation database. The query may include sending the validation image from the vehicle to an application, such as the application discussed above on the mobile device. Additionally or alternatively, the query may include sending the validation image from the vehicle to a service provider device. For example, the validation image may be sent from the vehicle service provider device 608.

The validation image may be determined to match a confirmation data set stored in the confirmation database based on a comparison of the validation image to one or more of a document image, a confirmation image, and a composite image of the confirmation data set. The process for determining whether there is a match between the validation image and the one or more of the document image, the confirmation image, and the composite image of the confirmation data set may be carried out in a manner similar as described in relation to step 408, for example.

If the validation image is determined not to match any of the confirmation data sets of the confirmation database at step 428 (e.g., "NO"), then method 400 proceeds to perform a refusal action at step 434. The one or more vehicle refusal actions at step 434 may include one or more of preventing an engine start, creating an alert to send to a service provider device, maintaining a lock box locked, and maintaining the vehicle of interest in a locked state. The alert to the service provider device may provide a message notifying the service provider device via a display of an attempted entry to the vehicle of interest. The alert may further include creating a flag in the confirmation data set of the user for future confirmation database queries.

Further, the refusal action at step 434 may further comprise generating a failure message. The refusal action at step 434 may further comprise providing a display enabling a user to retry the validation image.

Following step 434, method 400 determines whether an amount of time since performing the one or more refusal actions is greater than a threshold amount of time. If yes, (e.g., "YES"), then method 400 proceeds to end. If no (e.g., "NO"), then method 400 proceeds to step 438 at which a retry request is received. That is, a request to retry matching the validation image to one of the confirmation data sets is received at 438. The request to retry the matching may include re-taking the validation photo, in at least one example. Such a retry request may be received via a user input. For example, a user input received via the application.

Following receiving the retry request at step 438, method 400 includes determining whether a number of retry events performed is greater than a predetermined threshold of retry events. The number of retry events may be tracked via the application, for example.

If the number of retry events exceeds the threshold (e.g., "YES"), then method 400 proceeds to end. In one or more examples, method 400 may further include generating an alert to a service provider responsive to the number of retry events exceeding the threshold.

If the number of retry events does not exceed the threshold, (e.g., "NO"), then method 400 moves to step 442 to determine whether a match has been formed with one of the confirmation data sets stored in the confirmation database. The determination of whether an image match has been formed may be carried out as discussed in step 428, for example. If an image match is not formed (e.g., "NO"), then method 400 proceeds to step 436. If an image match is formed (e.g., "YES"), then method 400 proceeds to step 430.

In this way, two separate validation actions may be carried out to confirm user authorization for vehicle use, utilizing three separate images of the user. That is a first validation action may be performed during contract processing at step 408. A second validation action may be performed during actual vehicle use at step 428. Further the first validation action requires a document image of the user and a confirmation image of the user, which is used to form a confirmation data set. The second validation action requires a validation image of the user at the point of vehicle use. Therefore, three total images of the user are required. Moreover, one or both of the confirmation image and the validation image may be taken in real-time. Thus, the approach disclosed herein advantageously achieves the technical advantage of increased accuracy in authenticating a user for vehicle use compared to previous approaches.

Figure 5:
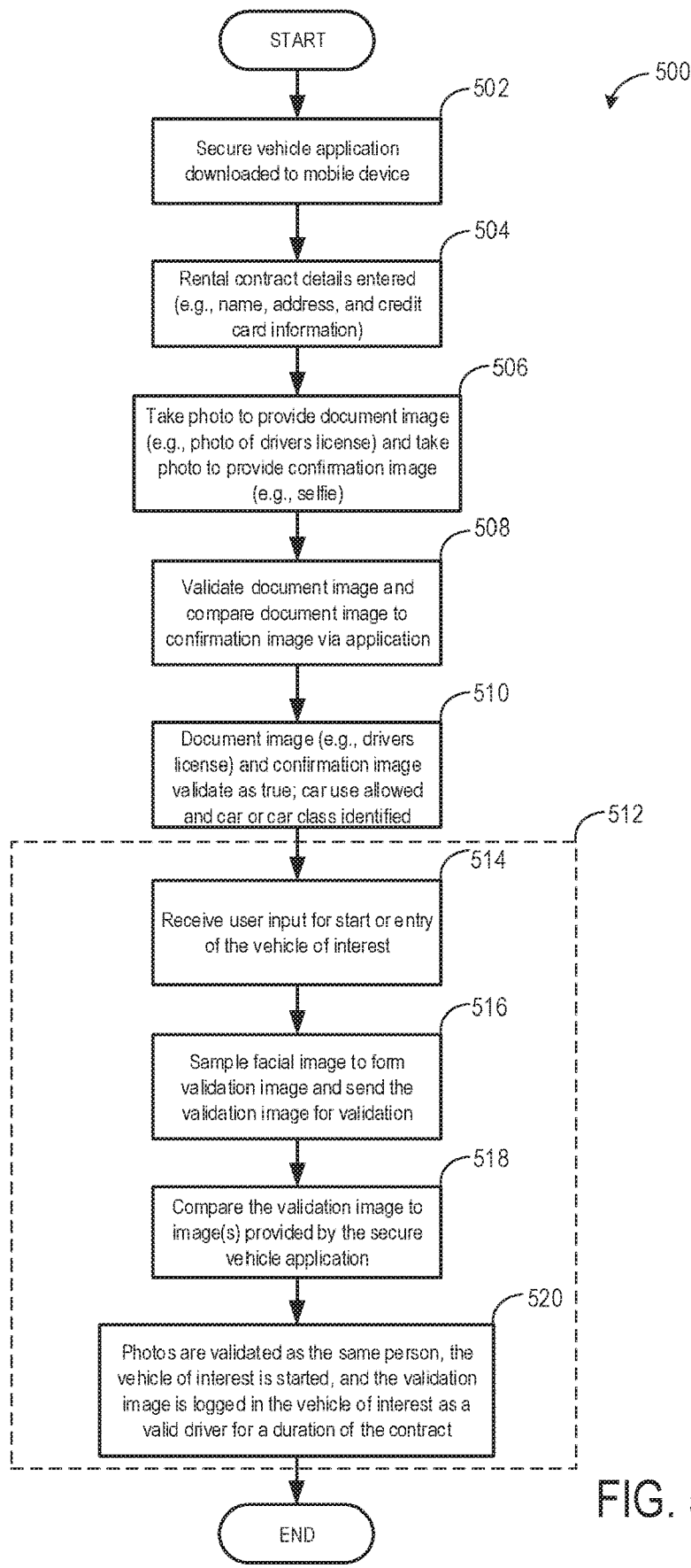
FIG. 5 shows a flow chart of a method according to at least one example of the present disclosure.

Turning to FIG. 5, FIG. 5 shows a flow chart of a method 500 according to at least one example of the present disclosure. It is noted that method 500 may additionally or alternatively include one or more of the steps disclosed with regards to method 400.

Method 500 begins at step 502, where a secure vehicle application, also referred to herein as the application, may be downloaded onto a mobile device. The secure vehicle application may be a user application that is downloaded onto the mobile device responsive to a user input. In at least one example, the mobile device may be a smart phone. The mobile device may be a mobile device such as 128, 242, and 604 (shown in FIG. 6), for example. The secure vehicle application may provide a graphical user interface by which a user may register for a contract. In at least one example, the contract may be a rental contract, such as a car rental contract or a car share contract.

At step 504 of method 500, rental contract details are received at the mobile device. In particular, rental contract details may be entered via user input received at the mobile device on the secure vehicle application. Such rental contract details may include one or more of a user name, address, and credit card information. Additionally, details as to one or more of a duration of the contract, car insurance preferences, authorized user requests, and type of car may also be entered. Such contract details may additionally or alternatively include contract information as described at step 402 of method 400, for example.

Following step 504, method 500 moves to step 506. At step 506, a photo is taken to provide a document image. For example, a photo of a driver license of the user is taken to provide the document image. The photo may be taken via a camera of the mobile device. However, it is also contemplated that the photo may be taken via a camera external to the mobile device. For example, the photo of the driver license may be taken via a scanner, an external digital camera, or a tablet camera, among others. The document image may be sent to the mobile phone and uploaded to the secure vehicle application. It is noted that the document image may be required to include the predetermined facial data points and/or estimated amount of a user's face discussed in relation to FIG. 1 to be utilized as a document image for matching purposes.

Additionally, step 504 may further include taking a photo of the user to provide a confirmation image. The photo taken for the confirmation image may be a photo of the user taken in real-time via the mobile device, in at least one example. That is, the photo taken of the user to provide the confirmation image may be taken immediately after entering the contract details, while still completing the contract. For example, the confirmation image may be a selfie or other photo of the user taken via the camera of the mobile device. By taking a photo of the user in real-time via the mobile device as the confirmation image, improved security may result. That is, such a real-time photo may help to ensure the identity of the user is accurate for contract purposes. However, alternatively, a photo of the user for the confirmation image may be taken via a camera external to the mobile device. For example, the photo of the user for the confirmation image may be taken via an external digital camera or a tablet camera. It is noted that the confirmation image may be required to include the predetermined facial data points and/or estimated amount of a user's face discussed in relation to FIG. 1 to be utilized as a confirmation image for matching purposes.

Turning to step 508 of method 500, step 508 includes validating the document image. Such validation includes comparing the document image to the confirmation image via the secure vehicle application via facial recognition. For example, the document image and the confirmation image may be compared locally on the mobile device via facial recognition integrated into the secure vehicle application. Alternatively, facial recognition comparison of the document image and the confirmation image may be performed via a service provider device communicatively coupled to the mobile device. For example, the service provider device may be service provider device 608, as shown in FIG. 6. By comparing the document image and the confirmation image via the service provider device, the technical advantage of a reduced processing load on the mobile may be achieved. In at least one example, it is noted that validation of the document image may also include confirming that the document is part of a pre-approved list of documents for use in conjunction with the contract. For example, validating that the document image is a document image of a driver license in the case of a car rental or a car share contract.

Following step 508, method 500 moves to step 510 which includes validating the document image and the confirmation image as true. That is, at step 510, the document image (e.g., the driver license) and the confirmation image are validated as being images of the same user based on the comparison performed at 508. Responsive to validating the document image and the confirmation image as true, a success message may be displayed via the secure vehicle application on the mobile device. Additionally or alternatively, one or more of a message that car use is allowed, a message indicating a specific car for use, or a message indicating a car class for use (e.g., compact, mid-size, large, convertible, economy, premium) may be displayed via the secure vehicle application on the mobile device. In this way, the user is provided feedback as to the validation of the document image and the confirmation image.

Moreover, in at least one example, validating the document image and the confirmation image as true may further include forming a confirmation data set and sending the confirmation data set to a confirmation database. The confirmation data set may include one or more of the document image, the confirmation image, a composite image formed based on the document image and the confirmation image, and one or more confirmed rental contract details. For example, one or more of the above-discussed rental contract details such as a user name, address, and credit card information, a duration of the contract, car insurance preferences, authorized user requests, the specific car preferred by the user (for example, indicated at 504), the car class preferred by the user (for example, indicated at 504), as well as one or more of the indicated specific car for use (for example, indicated at 510) and the indicated car class for use (for example indicated at 510). The confirmation data set may be sent to a confirmation database for storage. For example, the confirmation data set may be sent to a confirmation database of the service provider, such as shown at FIG. 6.

Following step 510, method 500 moves to step 514. It is noted that steps 514, 516, 518, and 520 are carried out when the user is positioned at or within a vehicle of interest for the contract, as indicated by dashed box 512. In particular, steps 514, 516, 518, and 520 may be carried out while the user is positioned within a driver seat of the vehicle of interest. The vehicle of interest may be the specific car for use or a car that is within the car class indicated via the secure vehicle application at step 510, for example. Steps 502, 504, 506, 508, and 510 may also be carried out within the vehicle of interest, in at least one example. However, alternatively, in other examples steps 502, 504, 506, 508, and 510 may be carried while a user is attempting entry into the vehicle of interest. The vehicle of interest may comprise any one or combination of features as discussed in relation to FIGS. 1-3.

Turning again to step 514, at step 514 a user input for start or entry of the vehicle of interest is received. The user input for the start may be a user input to a start button of the vehicle, in at least one example. In another example, the user input for the start may be insertion of a key into an ignition and/or turning of the key in the ignition of the vehicle of interest. Further, in at least one example, the user input for the start may be a user input to the secure vehicle application to start the vehicle of interest. In method 500, the use is positioned in a driver seat when providing the user input to start the vehicle of interest.

The user input for entry of the vehicle of interest may include input to a car door, such as pulling of a car door handle and/or touching the car door handle, for example.

Following step 514, method 500 includes sampling a facial image of the user to form a validation image and sending the validation image for validation at step 516. In at least one example, the facial image of the user may be sampled via the vehicle of interest. For example, the vehicle of interest may include cabin monitoring software, and the cabin monitoring software may be utilized to sample the facial image of the user via the cameras 209 of sensor subsystem 210, as discussed in FIG. 2, for example. It is noted that the validation image may be required to include the predetermined facial data points and/or estimated amount of a user's face discussed in relation to FIG. 1 to be utilized as a validation image for matching purposes.

Once the facial image of the user has been obtained to form a validation image, the vehicle of interest sends the validation image for validation via facial recognition. That is the validation image is sent to be compared to against image data for matching purposes. In at least one example, the vehicle of interest may send the validation image to a server provider device (e.g., server provider device 608 shown at FIG. 6) for validation. Additionally or alternatively, the validation image may be sent to the mobile device for validation via the secure vehicle application. In one or more examples, a validation module may be integrated into the secure vehicle application or integrated into the server provider device to perform the validation.

Following step 516, method 500 includes comparing the validation image to one or more images provided by the secure vehicle application. For example, the validation image may be compared to the document image that was previously validated. Additionally or alternatively, the validation image may be compared to the confirmation image that was previously used to validate the document image. Further, in at least one example, a composite facial image based on both the document image and the validation image may be compared to the validation image for validation purposes. It is noted that such comparison of the validation image at step 518 may be carried out via the secure vehicle application. Additionally or alternatively, the comparison of the validation image at step 518 may be carried out at a server provider device. In at least one example, validating the validation image may include accessing a confirmation database comprising the confirmation data set formed at step 510, such as confirmation database 602.

Following step 518, step 520 of method 500 may include validating that the photos are the same person, starting the vehicle of interest, and logging the validation image in the vehicle of interest as a valid driver for the duration of the contract. That is, as step 520, the validation image is validated as being the same user as one or more of the document image, the confirmation image, and the composite image. Following validation of the validation image, the vehicle of interest may be started. For example, one or more of an electric motor and combustion engine are started. The vehicle of interest further stores the validation image of the user for the duration of the contract, such as the duration confirmed at step 510 of method 500. Alternatively, if a vehicle entry request was received at step 514 instead of a request to start the vehicle, then step 520 may include providing entry instead of starting the vehicle. Providing entry may include unlocking a door to enable entry into a cabin of the vehicle. In one or more examples, the logged validation image in the vehicle of interest may be used to validate that a user requesting subsequent starts for the vehicle of interest is a valid user.

In this way, two separate validation actions may be carried out to confirm user authorization for vehicle use, utilizing three separate images of the user. These three separate images of the user may include the document image (e.g., an image of a driver license), the confirmation image (e.g., a photo of a user taken via a mobile device), and the validation image (e.g., taken via a camera of the vehicle). Thus, the technical advantage of improved accuracy in authenticating a user for vehicle use results compared to previous approaches.

Turning now to FIG. 6, FIG. 6 shows an example communication diagram 600 according to one or more examples of the present disclosure. In particular, as shown in communication diagram 600, a service provider device 608 is a computing device supporting confirmation database 602. It is noted that one or more confirmation data sets are stored on confirmation database 602. Additionally, mobile device 604 communicates with the service provider device 608 and the confirmation database 602. It is noted that each of the mobile devices 604 comprises the application, also referred to as the secure vehicle user application, described herein. Additionally shown in FIG. 6 is vehicle 606. Vehicle 606 may be one of a plurality of vehicles of a car rental or a car share company. As illustrated, the mobile device 604 may be positioned within vehicle 606.

Looking to mobile device 604, mobile device 604 sends a document image 612, a confirmation image 614, and contract information 616 to the service provider device 608.

In one or more examples, the service provider device 608 may perform a matching analysis between the document image 612 and the confirmation image 614. Then, responsive to a match being formed between the document image 612 and the confirmation image 614, the service provider device 608 may send a confirmation data set to the confirmation database 618. Alternatively, the match may be formed between the document image 612 and the confirmation image 614 via the application on the mobile device prior to sending the document image 612, confirmation image 614, and contract information 616 to the service provider device 608.

Responsive to receiving the document image 612, the confirmation image 614, and the contract information 616 at the service provider device 608, the service provider device forms a confirmation data set 618 that may be sent to confirmation database 602 for storage and that may be sent to mobile device 604. It is noted that the document image 612, the confirmation image 614, and the contract information 616 may include one or more of the features discussed herein.

Turning now to vehicle 606, vehicle 606 may query the confirmation database 602 to find a match for validation image 636. As part of the query, vehicle 606 may send the validation image 636 to the database for comparing the validation image 636 to one or more confirmation sets stored in the confirmation database. The validation image 636 may be an image taken of a user via one or more cameras of the vehicle. The confirmation database 602 may then send a validated confirmation data set 638 to the vehicle 606, where the validated confirmation data set is a confirmation data set that matches the validation image 636. The validated confirmation data set 638 may be sent to the vehicle 606 to be logged, for example. Thus, the vehicle 606 may have easy access to the contract information and images of the user(s) authorized to operate the vehicle.

Thus provided herein are systems and methods for validating a user for vehicle operation. In at least one example developed by the inventors, using an application on a mobile device that contains facial recognition software, a car sharing service or traditional car rental agency can register a potential user along with a photo of their driver license, name, address, credit card information, etc. The photo of the user's driver license may be confirmed via a confirmation photo, such as a photo taken within the application, and the facial recognition software of the application may be used to validate the user's driver license against the confirmation photo.

Then, in at least one example, the user may enter a vehicle, and while positioned in the driver seat, the vehicle may identify the user via facial recognition as the user who rented the vehicle. Responsive to the vehicle validating the user as the user who rented the vehicle, the vehicle may then be started and driven for a period of time agreed to in the contract. However, if a user who enters a vehicle and is positioned in the driver seat is not validated as the user who rented the vehicle, the vehicle may be prevented from starting and being driven, even if a vehicle start request is received.

In at least one example, the facial recognition performed by the vehicle may be performed via facial recognition software that is part of a vehicle cabin monitoring software and mobile application.

The inclusion of the two tier facial validation process disclosed herein achieves the technical advantage of improved accuracy in authenticating a user for vehicle use. For example, the systems and methods disclosed herein may advantageously tie the user to the vehicle and minimize unauthorized users from utilizing rental and car share vehicles. Moreover, improved efficiency may be achieved in comparison to traditional car rental check out processes that may include a human to perform validation of a driver license and ensuring authorized users are paired with rental vehicles. The methods disclosed herein may be carried out via any one or more of the systems disclosed herein.

In a first approach, the method may comprise comparing a validation image to one or more confirmation data sets, wherein each of the one or more confirmation sets is formed based on matching a document image and a confirmation image, performing vehicle operability action responsive to the validation image matching a confirmation data set of the one or more confirmation data sets, and performing a refusal action responsive to the validation image not matching the confirmation data. In a first example of the first approach, the validation image is formed via a vehicle cabin scan with an in-vehicle image sensor. In a second example of the first approach, which optionally includes the first option, the document image is a first image of a user, and the confirmation image is a second image of the user, and wherein the validation image is a third image of the user. In a third example of the first approach, which optionally includes one or both of the first and second examples, the validation image is an image of the user positioned in a driver's seat of the vehicle. In a fourth example of the first approach, which optionally includes one or more of the first through third examples, the refusal action includes preventing vehicle operability. In a fifth example of the first approach, which optionally includes one or more of the first through fourth examples, the refusal action includes one or more of sending a message to a user mobile device and sending a message to an administrator.

In a second example approach which optionally includes the first example, a method comprises performing an in-vehicle image scan to form a validation image of a user, comparing the validation image to confirmation data stored, the confirmation data including one or more confirmation data sets, each of the confirmation data sets including one or more of a document image, a confirmation image, and an aggregate image, enabling vehicle operability responsive to forming a match between the validation image and predetermined confirmation data, and performing a refusal action responsive to the validation image not matching the predetermined confirmation data.

The refusal action may include maintaining a door of the vehicle in a locked state, for example. Additionally or alternatively, the refusal action may include preventing a vehicle start, even when a start request is received. In one or more examples, the confirmation data set may be associated with contract information, such as contract information for a car rental. The confirmation data set may be stored in a database remote from the vehicle, for example. Moreover, in at least one example, the confirmation data set may be formed via a validation process that includes confirming a received document image matches a received confirmation image. Enabling operability of the vehicle may include one or more of enabling a vehicle start and unlocking one or more vehicle doors. Enabling the vehicle start may specifically comprise starting one or more of an engine (e.g., engine 333) and motor (e.g., 334) of the vehicle responsive to forming the match between the validation image and the predetermined confirmation data and receiving a start request.

In a third approach, which may optionally include one or both of the first and second approaches, a method comprises performing a first validation based on a document image of a first user and a confirmation image of a second user, and confirming the document image and the confirmation image match based on the first validation, and generating a confirmation data set. It is noted that confirming the document image and the confirmation image match includes determining that the first user and the second user are the same user. After the first validation, the third approach includes performing a second validation based on a validation image and the confirmation data set, confirming the validation image and the confirmation data set match based on the second validation, and performing an operability action for a vehicle. The validation image may be a validation image of a vehicle user. In examples where the validation image and the confirmation data set match, it is noted that the vehicle user is determined to be the same user as the confirmation data set user. That is, the vehicle user is determined to be the same user as the first user and the second user. In a first example of the third approach, performing the first validation and the second validation includes performing facial recognition. In a second example of the third approach, which may optionally include the first example, the first validation is performed via an application on a mobile device. In a third example of the third approach, which optionally includes one or both of the first and second examples, the method further comprises associating contract information with the user during generation of the confirmation data set. In a fourth example of the third approach, which optionally includes one or more of the first through third examples, performing the second validation further includes comparing data of the vehicle to the contract information of confirmation data set. In a fifth example of the third approach, which optionally includes one or more of the first through fourth examples, the validation image is generated via a camera of the vehicle. In a sixth example of the third approach, which optionally includes one or more of the first through fifth examples, the method further comprises, after confirming that the validation image and the confirmation data set match, storing the validation image locally at the vehicle. In a seventh example of the third approach, which optionally includes one or more of the first through the sixth approaches, each of the document image, confirmation image, and validation image include an amount of facial data points that is greater than a predetermined threshold.

The description of embodiments has been presented for purposes of illustration and description. Suitable modifications and variations to the embodiments may be performed in light of the above description or may be acquired from practicing the methods. The methods may be performed by executing stored instructions with one or more logic devices (e.g., processors) in combination with one or more additional hardware elements, such as storage devices, memory, image sensors/lens systems, light sensors, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method, comprising:
   comparing a validation image to one or more confirmation data sets, wherein each of the one or more confirmation data sets is formed based on matching a document image and a confirmation image;
   performing a vehicle operability action responsive to the validation image matching a confirmation data set of the one or more confirmation data sets; and
   performing a refusal action responsive to the validation image not matching the confirmation data set, wherein the refusal action includes preventing vehicle operability.

2. The method of claim 1, wherein the validation image is formed via an image sensor of a vehicle.

3. The method of claim 1, wherein the document image is a first image of a user, wherein the confirmation image is a second image of the user, and wherein the validation image is a third image of the user.

4. The method of claim 3, wherein the validation image is an image of the user positioned in a driver's seat of the vehicle.

5. The method of claim 1, wherein the validation image is compared to the one or more confirmation data sets prior to performing the vehicle operability action, wherein the vehicle operability action includes allowing the vehicle to start and allowing the vehicle to be driver, and
   wherein the validation image is compared to the one or more confirmation data sets prior to performing the refusal action, and wherein preventing vehicle operability includes preventing the vehicle from being driven.

6. The method of claim 1, wherein the refusal action includes one or more of sending a message to a user mobile device and sending a message to an administrator.

7. A method, comprising:
   performing an in-vehicle image scan to form a validation image of a user;
   comparing the validation image to stored confirmation data, the confirmation data including one or more confirmation data sets, each of the confirmation data sets including one or more of a document image, a confirmation image, and an aggregate image;
   enabling operability of a vehicle responsive to forming a match between the validation image and a confirmation data set of the one or more confirmation data sets; and
   performing a refusal action responsive to the validation image not matching any of the one or more confirmation data sets, wherein the refusal action includes preventing vehicle operability.

8. The method of claim 7, wherein the refusal action for preventing vehicle operability includes maintaining a door of the vehicle in a locked state.

9. The method of claim 7, wherein the refusal action for preventing vehicle operability includes preventing a vehicle start, even when a start request is received.

10. The method of claim 7, wherein the confirmation data set is associated with contract information.

11. The method of claim 10, wherein the confirmation data is stored in a database remote from the vehicle.

12. The method of claim 7, wherein enabling operability of the vehicle includes one or more of enabling a vehicle start and unlocking one or more vehicle doors.

13. A method comprising:
    performing a first validation based on a document image of a user and a confirmation image of the user;
    confirming the document image of the user and the confirmation image of the user match based on the first validation, and generating a confirmation data set responsive to confirming that the document image of the user and the confirmation image of the user match;
    performing a second validation based on a validation image of the user and the confirmation data set; and
    confirming the validation image of the user and the confirmation data set match based on the second validation, and performing an operability action for a vehicle responsive to confirming that the validation image of the user and the confirmation data set match.

14. The method of claim 13, wherein performing the first validation and the second validation includes performing automated facial recognition.

15. The method of claim 14, wherein the first validation is performed via an application on a mobile device.

16. The method of claim 13, further comprising associating contract information with the user during generation of the confirmation data set.

17. The method of claim 16, wherein performing the second validation further includes comparing data of the vehicle to the contract information associated with the confirmation data set.

18. The method of claim 13, wherein the validation image of the user is generated via a camera of the vehicle.

19. The method of claim 13, further comprising, after confirming that the validation image of the user and the confirmation data set match, storing the validation image locally at the vehicle.

20. The method of claim 13, wherein each of the document image of the user, the confirmation image of the user, and the validation image of the user include an amount of facial data points that is greater than a predetermined threshold.

* * * * *